United States Patent Office 3,008,059
Patented Nov. 7, 1961

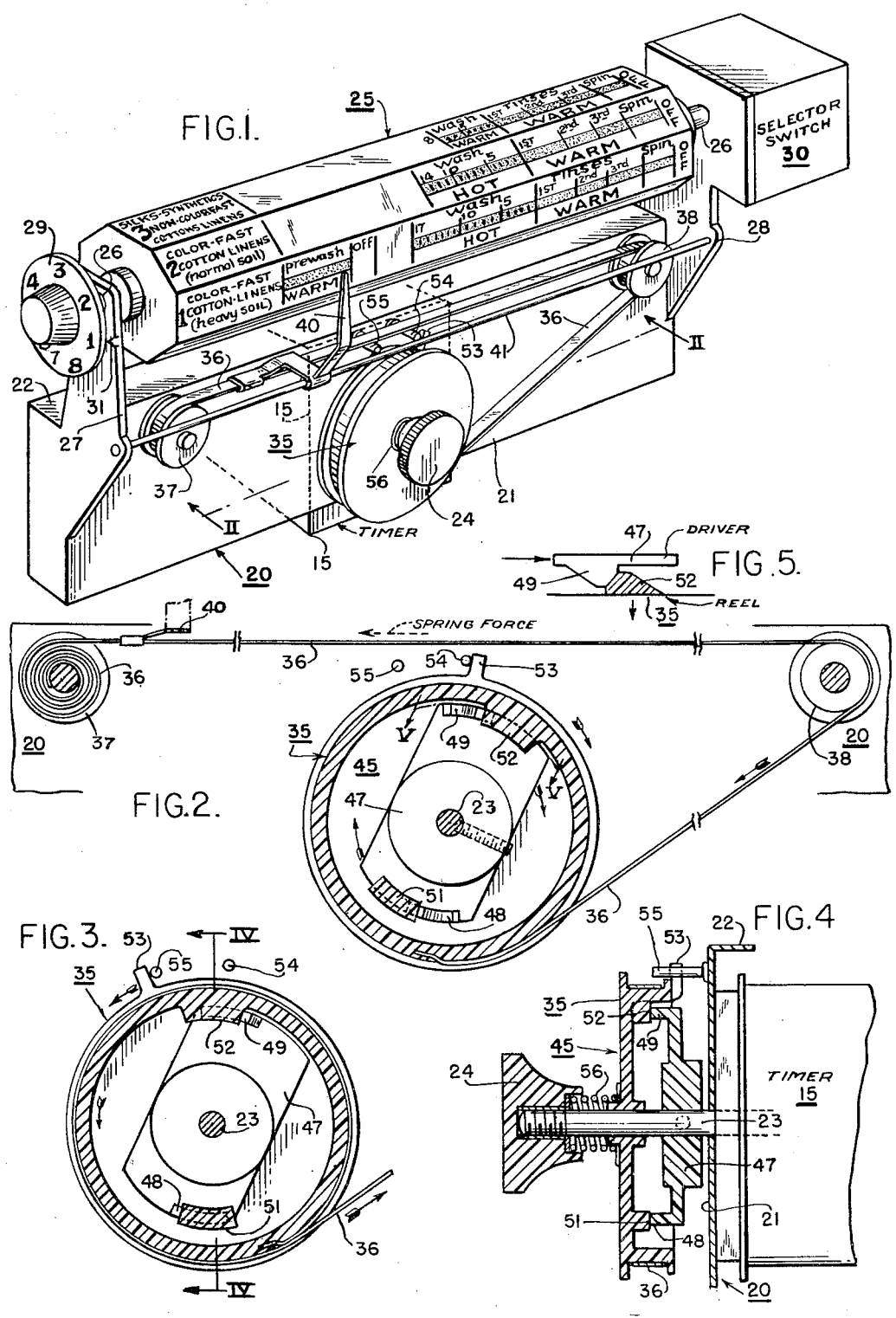

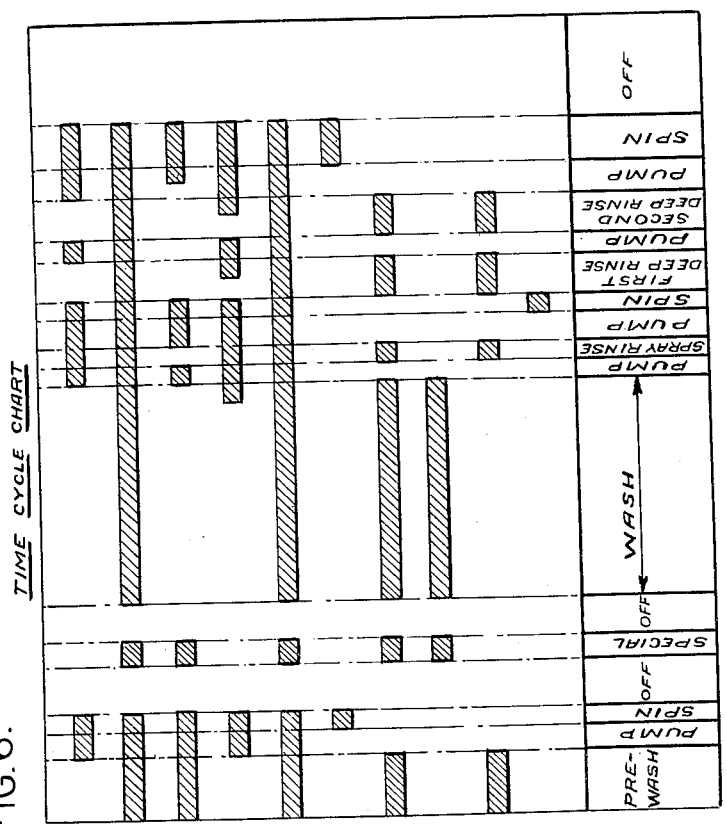
FIG. 6.
FIG. 7.
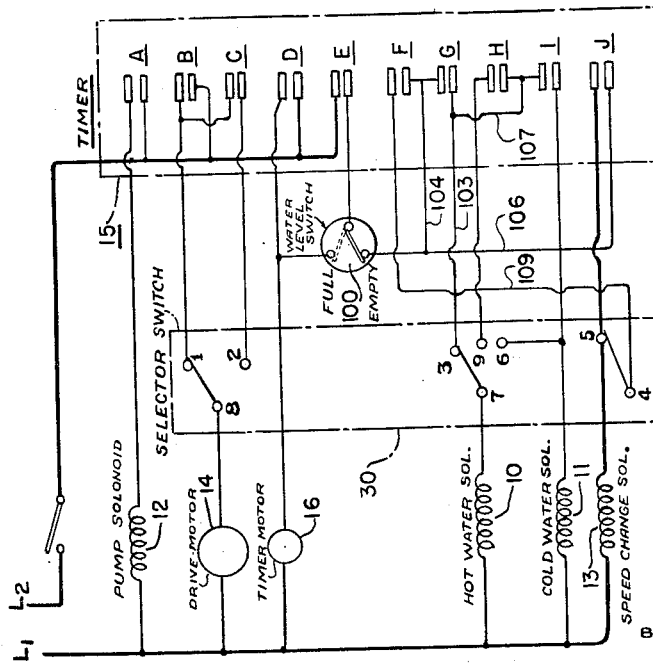
INVENTORS
HAROLD F. GORSUCH
RICHARD F. SPANGLER
BY Robert T. French
ATTORNEY

3,008,059
CONTROL FOR CLOTHES WASHER OR DRYER OR THE LIKE
Harold F. Gorsuch and Richard F. Spangler, Mansfield, Ohio, assignors to Westinghouse Electric Corporation, a corporation of Pennsylvania
Filed Oct. 27, 1958, Ser. No. 770,251
9 Claims. (Cl. 307—141.8)

This invention relates to control mechanism for apparatus, such as an automatic clothes washer or dryer, having a plurality of electrical devices which are operated in sequence, and it has for an object to provide improved control mechanism of this type.

Another object of the invention is to facilitate selection of a desired sequence of operations of a plurality of electrical devices.

While control mechanism incorporating the present invention has widespread application in all fields involving selection of one of a plurality of programs of operations of electrical devices, it is ideally suited for use in controlling domestic laundry equipment, for example, home clothes washers and clothes dryers, and it is hereinafter shown and described, by way of example, in connection with a home clothes washer.

An automatic clothes washer is conventionally provided with a timer that automatically brings about a desired sequence of operations; for example, washing, draining, spray rinse, draining, spin, deep rinse, draining, deep rinse, draining, spin. The timer is provided with indicia showing these several steps and also an indicator cooperating with the indicia to show at what part of the program or cycle the timer is located at any instant. The timer is driven through the complete cycle or program by an electric motor but is adapted to be manually advanced to any desired part of the program, more particularly, it is adapted to be advanced at the beginning of the program to shorten the washing period if less time than the maximum period of washing is desired.

For some materials, it is desirable to modify the program effected by the timer. For example, for washing blankets, it is desirable to soak the blankets with reduced agitation rather than employ a conventional agitating washing action. For certain other materials, it is desirable to omit a spin operation. The present invention provides a control that is readily modified to provide programs to meet the requirements of the different materials. There is provided a selector switch that modifies the action of the timer; for example, it selects one of several circuits extending through the timer to select the appropriate water temperature. Furthermore, the selector switch selects circuits that either carry out agitation of the material or substantially prevent agitation thereof. Other contacts select circuits that either prevent spinning or provide either one or two spin periods. Cooperating with the selector switch is a member that bears several faces or series of indicia representing the several programs that are effected by the several positions of the selector switch. This member and the selector switch are actuated in unison by a common actuating member. An indicator positioned by the timer to show the position of the latter cooperates with the face or the series of indicia corresponding to the position of the selector switch that is in effect at the time.

The above and other objects are effected by the invention as will be apparent from the following description and claims taken in connection with the accompanying drawings forming a part of this application, in which:

FIG. 1 is a perspective view of a control constructed in accordance with the present invention;

FIG. 2 is a sectional view taken along the line II—II of FIG. 1 looking in the direction indicated by the arrows;

FIG. 3 is a fragmentary sectional view similar to FIG. 2, but showing elements thereof in a different position;

FIG. 4 is a sectional view taken along the line IV—IV of FIG. 3 looking in the direction indicated by the arrows;

FIG. 5 is a development of a pair of cams, taken along the line V—V of FIG. 2, looking in the direction indicated by the arrows;

FIG. 6 is a combined diagrammatic representation of the electric circuits and the electrical devices controlled thereby, together with a time cycle chart for the timer switches shown in the circuits; and FIG. 7 is a chart indicating selector switch contact positions for various programs.

Referring now to the drawings, the invention is shown applied to a time-controlled sequence switch or timer of the type commonly employed for controlling the various electrical devices of an automatic washing and centrifuging machine of the domestic type. These machines usually employ hot and cold water inlet valves which are opened and closed by solenoids, shown at 10 and 11, respectively, in FIG. 6. A discharge pump or its equivalent is used for draining water from the tub and is controlled by a solenoid indicated at 12. These machines usually wash the fabrics at a relatively low washing speed and centrifuge the same at high speed. This operation is obtained by means of a multi-speed mechanism driven by a motor 14 and adjusted to its various speeds by a speed change solenoid indicated at 13. Energization of the solenoid provides high speed operation for centrifuging, and deenergization provides relatively low speed operation for washing.

These various electrical devices are sequentially operated by a timer 15, driven by a motor 16, to provide a predetermined sequence of steps in a washing and centifuging program. For example, the solenoids 10 and/or 11 are first energized to open one or both valves to admit water at the desired temperature to the machine and the motor 14 operates to drive the machine at slow speed to wash the fabrics. At the conclusion of the washing program, the discharge pump is activated by its solenoid 12 to discharge the vitiated washing water from the machine. The inlet valves may again be operated for admitting rinse water to the machine and the motor operated to drive the machine at slow speed for rinsing the fabrics. At the conclusion of the rinsing period, the pump is again activated by its solenoid 12 to discharge the vitiated rinse water from the machine and the multi-speed mechanism is then adjusted by its solenoid 13 to operate the machine at high speed. At this time, the rinse water is centrifugal from the fabrics in the machine and, at the conclusion of the centrifuging period, all of the electrical devices are deenergized and the program is complete. This program has been described in its simplest form, but is sufficient to illustrate a typical known washing program which may be modified by the control apparatus of the present invention to provide a plurality of different selectable programs of fabric treatments, specific examples of which will be described later.

Referring now to FIG. 1 of the drawings, the timer 15 is supported by a frame 20 at the rear of a vertical front panel 21 and beneath a top panel 22, with its drive shaft 23 (FIG. 4) extending forwardly through the front panel 21 and having a control knob 24 secured thereon for manual advancement of the timer mechanism.

A polygonal drum 25 is rotatably supported, by an axial shaft 26, between parallel spaced ears 27—28 projecting upwardly from opposite ends of the frame 20. The shaft 26 on which the drum 25 is fixed has terminal portions extending beyond the frame ears 27—28 which rotatably support it, one terminal portion carrying a knob 29 by which the drum may be manually rotated to a plurality of positions, and the other terminal extending through a selector switch 30 carried by the frame ear 28.

The selector switch 30 may be of any desired construction and, in the particular arrangement illustrated (FIG. 6), contains six sets of contacts together with cams (not shown) carried by the shaft extension for closing various combinations of these contacts to modify the program of sequential operation of the electrical devices which would otherwise be provided by the timer 15, as will be described in greater detail hereinafter.

The drum 25, in the arrangement herein illustrated, has eight flat sides and each side carries a straight line of indicia for the program of fabric treatment in effect when that side of the drum is presented to the user. The selected position of the drum may be indicated by numerals 1 to 8 provided on the knob 29 at the end of the drum shaft, adapted to align with a fixed indicator 31 provided on the ear 27 adjacent the periphery of the knob 29.

The cams carried by the extension of shaft 26, within the selector switch 30, are so positioned with respect to the drum as to effect such modification of the sequence of treatments provided by the timer 15 as to provide the particular program of fabric treatments called for by the line of indicia for the selected position of the drum. It will be apparent that, by use of the single control knob 29, there may be effected both positioning of the line of indicia for the selected program and positioning of the selector switch to modify the controlling action of the timer to effect the desired sequence of treatments constituting the selected program.

In order to show the user the progress of the washing program at any time, an indicator operating in conjunction with the timer traverses the line of indicia for the particular program being performed. At the end of the program, a clutch releases an operative connection between the timer and the indicator, permitting a spring to return the indicator to its starting position. To this end, a reel 35 is mounted on the timer shaft 23 between the control knob 24 thereof and the front panel 21 of the supporting frame, this reel having connected thereto one end of a belt 36 of spring steel whose other end is self-wound upon a freely rotatable pulley 37 mounted on the front panel 21. Intermediate its ends this belt travels over an idler pulley 38 so positioned that the portion of the belt between the pulleys 37 and 38 is disposed parallel to the axis of rotation of the drum 25. An indicator or pointer 40 is secured to the belt 36 between the two pulleys 37 and 38 and may be supported and guided by a rod 41 carried by the frame ears 27 and 28 and likewise extending parallel to the axis of rotation of the drum 25.

A clutch 45, hereinafter described in detail, provides a releasable driving connection between the timer shaft and the reel so that, as the timer shaft rotates during operation of the timer, the reel will be correspondingly rotated and the belt 36 wound thereon and unwound at its other end from the pulley 37, with the result that the indicator 40 is moved rectilinearly in overlying relation to the line of indicia on the face of the drum corresponding to the selected position of the latter. The indicator 40 and the indicia on the selected drum face are so related that the indicator shows at all times the progression of the selected sequence of treatments of the fabrics during the selected program. When the timer shaft reaches the end of its rotational movement, the indicator 40 will have reached the "off" position at the extreme right-hand end of the line of indicia, as viewed in FIG. 1, and the clutch 45 will release the reel, permitting the self-winding effect of the spring to function, thereby returning the indicator to its extreme left-hand position, thus readying it for the next program to be utilized.

It will be noted that the lines of indicia shown on the drum 25 are not all of the same length, inasmuch as various cycles are of different lengths. All of the programs terminate at the same point linearly of the drum and some start at different points linearly thereof. By turning the timer knob 24, the user may manually advance the indicator 40 from left to right to effect alignment of the indicator with the starting point of the line of indicia for the selected program.

Reference is now made to FIGS. 2 to 5, inclusive, in connection with a detailed description of the clutch mechanism between the timer motor and the indicator reel. As best shown in FIG. 4, the reel 35 is rotatably supported on the timer shaft 23. A reel driver 47 is secured on the timer shaft 23 rearwardly of the reel 35, the driver being provided with a pair of driver cams 48 and 49 adapted to engage cooperating cams 51 and 52, respectively, formed on the rear surface of the reel 35. The cooperating cams 48, 51 and 49, 52 have mating surfaces inclined at a relatively steep angle, as best shown in FIG. 5, with the result that the major component of force imparted from the driver 47 to the reel 35 is in a direction tending to rotate the reel.

The reel 35 carries an external stop member 53 adapted to engage a pin 54 to limit its counterclockwise rotation (FIG. 2) and adapted to engage a similar pin 55 to limit its clockwise rotation (FIG. 3). FIG. 2 shows the reel 35 and the driver 47 in their positions at the start of a timer cycle or washing program. As the timer progresses through its cycle, its shaft 23 will rotate the driver 47 which, in turn, will rotate the reel 35, through engagement of the driver cams 48 and 49 with the reel cams 51 and 52, respectively. This rotation of the reel by the driver will continue throughout the major portion of the cycle and just before the termination of the cycle, the parts will be in the positions shown in FIG. 3 with the reel stop 53 engaging the pin 55 to prevent further clockwise rotation of the reel. However, the timer shaft and driver continue to rotate in clockwise direction and, since the reel cannot rotate further, the mating cam surfaces start to slip with the result that the reel 35 is moved axially on the timer shaft 23 in a forward direction, or to the left as viewed in FIG. 4, against the biasing force of a compression spring 56 positioned between the reel and the control knob 24.

Continued rotation of the driver and of the driver cams with respect to the reel cams will eventually result in the lifting of the reel to the point where the cam inclined surfaces no longer engage, whereupon the biasing effect of the self-winding belt 36 produces counterclockwise rotation of the reel and its return to its starting position, shown in FIG. 2.

In order to prevent interference of the driver cam 48 with the reel cam 52 during counterclockwise return of the reel to its starting position, the driver cam 48 and the cooperating reel cam 51 are positioned closer to the axis of the timer shaft than is the other pair of mating cams.

Reference is now made to FIGS. 6 and 7 which illustrate schematically the wiring diagram for the clothes washer and its control previously described, together with the time cycle chart indicating the "on" periods of the timer switches for a preferred program of clothes washing which is considered to be most nearly typical of the programs preferred by the majority of housewives for conventional washing. The legends provided in the boxes at the bottom of the time cycle chart of FIG. 6 indicate the operations being performed by the washer at various periods throughout the complete program for the above-mentioned typical program.

FIG. 7 constitutes a tabulation of the eight programs provided by the control apparatus herein illustrated and shows six different pairs of switch contacts for the selector switch, and indicated which of these pairs of contacts are closed during each of the eight listed programs. Program No. 1 in the tabulation of FIG. 7 is the "typical" program to which the legends at the bottom of the time cycle chart of FIG. 6 relate.

The circuit diagram of FIG. 6 shows, in addition to the electrical devices referred to earlier in the specification, a water level switch 100 which may be of any suitable type and whose contact arm occupies the position shown in full lines when the machine is empty or is filling with water, and which occupies the position shown in dotted lines when the machine is filled with water or is emptying.

The selector switch 30 and the timer mechanism 15 are represented in this diagram by the dot-dash rectangles carrying these reference characters. Referring now to the selector switch 30 and the tabulation of FIG. 7, it will be noted that program No. 1 indicates that contacts 1—8, 3—7 and 4—5 are closed while contacts 2—8, 6—3 and 7—9 are open. For ease of description the ten switches of the timer 15 have been lettered A to J, inclusive, from top to bottom as viewed in FIG. 6. It will be noted that in the timer cycle chart forming a portion of FIG. 6, the sectioned blocks representing closed or on periods for the contacts are aligned with the various timer switches A to J, transversely of the figure. In other words, the sectioned blocks horizontally aligned with timer switch A indicate closed periods of that switch. The remaining horizontal rows of blocks are similarly indicative of the closed time of the remaining switches with which they are respectively aligned horizontally. These blocks may represent the cam lobes which effect operation of their respective switches.

It will be noted from the time cycle chart that, at the commencement of a program, timer switches B, C, E, G and I are closed. Closing of timer switch B provides circuitry for energization of the main drive motor 14 from line conductor L1 through the drive motor, selector switch contacts 8—1 and timer switch B to the opposite line conductor L2. Obviously, at the start of any program, the line switch in conductor L2 will be manually closed. Energization of the main drive motor 14 causes the clothes containing basket of the washer to rotate at slow speed in order to agitate and tumble the clothes during the ensuing washing and rinsing periods of the selected program, it being understood that the speed change solenoid 13 is now deenergized.

Closing of the timer switch C has no effect upon the operation of the washer during program No. 1, inasmuch as selector switch contacts 8—2 are open.

At the commencement of the program, the timer should not begin running until the basket has been supplied with a suitable quantity of water. As long as switch D, directly controlling timer motor 16, is open and the water level switch is in its "empty" position, closing of timer switch E has no effect upon the timer motor.

Closing of timer switch G establishes a circuit to the hot water solenoid from L1 via the hot water solenoid 10, selector switch contacts 7—3, wire 103, timer switch G, wire 104, wire 106, water level switch 100 and timer switch E to L2. Similarly, closing of timer switch I provides a circuit to the cold water solenoid from L1 through the solenoid 11, timer switch I, wire 107, timer switch G, wire 104, wire 106, water level switch 100, and timer switch E to L2. As a result, from admission of both hot and cold water to the washer basket, the latter becomes supplied with a mixture of warm water suitable for prewash.

When the tub has received the desired quantity of water, the water level switch automatically moves from the "empty" position to the "full" position, thereby establishing a circuit for the timer motor 16 from L1 through the motor 16, water level switch 100 and timer switch E to L2, thereby starting the timer motor and initiating rotation of the timer mechanism to start progression of the program. Assuming that the user placed detergent and clothes in the washer prior to the commencement of the cycle, the clothes will now be prewashed throughout the period marked "prewash" at the bottom of the time cycle chart. When the water level switch moved from "empty" to "full" position, it interrupted the two circuits for the hot water and cold water solenoids 10 and 11, thereby terminating admission of water to the tub.

At the end of the "prewash" period, timer switches G and I open and timer switches A and D close. Closing of timer switch A establishes a circuit to the pump solenoid 12 from L1 through the solenoid and timer switch A, to L2. In the washer herein described, the pump is driven from the main drive motor of the washer and preferably includes a driven member moved into engagement with a driving member on the motor, the movement being effected by the solenoid 12 when energized. Such a pump drive from a main motor is well known in the art and, if more detailed description thereof is desired, reference may be had to U.S. Patent No. 2,554,672. In the presently discussed washing program, the pump will now be operated to remove from the tub the vitiated wash water, inasmuch as timer switch B is still closed and, accordingly, still provides energization of the main drive motor to motivate the pump.

Inasmuch as it is desired that the timer motor continue to be energized throughout not only the pump period but also the following spin period of the program, it is necessary that timer switch D now be closed to establish a circuit for the timer motor from L1 through the motor and timer switch D to L2 inasmuch as the timer switch E, which has heretofore energized the timer motor, will have its circuit interrupted by the water level switch, since the vitiated water has been exhausted from the tub.

At the beginning of the spin period, the timer switch F is closed to establish a circuit through the speed change solenoid 13 from L1 through the solenoid 13, selector switch contacts 5—4, wire 109, timer switch F, wire 104, water level switch 100 and timer switch E to L2. During this "spin" period, the basket rotates at relatively high speed to centrifuge remaining vitiated water from the clothes, and the pump continues to operate to remove the water from the tub.

At the end of the "spin" period, all of the timer switches are opened and the prewash portion of the program terminated. As indicated on the time cycle chart, there is provided an "off" period during which the user may add new detergent to the washer and then manually advance the timer mechanism by rotation of the control knob 24 until the main wash period is reached.

When manually advancing the timer through the first "off" period, the period labeled "special," and the second "off" period, it is desirable that the user open the line switch to save wear on the contacts operated by the timer during the "special" period. However, should the user fail to open the line switch at such time, closing of these five switches B, C, E, G and H will have no effect in the standard cycle now being described because of the particular combination of selector switch contacts closed during this program. The reason for closing these five timer switches at this particular point in the complete timer cycle will be explained later in describing another program in which they are effective.

At the commencement of and throughout the main wash period, timer switches B, E, G and H are closed. Closing of timer switch B energizes the drive motor to rotate the clothes basket, and closing of timer switch E energizes the timer motor 16, once the tub is sufficiently filled with water to move the water level switch from "empty" to "full" position. Closing of timer switch G operates the hot water solenoid 10 to admit hot water to the tub but closing of timer switch H has no effect on the circuits in this particular program.

At the end of the wash period, timer switches G and H are opened, and timer switches A, C and D are closed. Closing of timer switch A starts the pump, inasmuch as the main drive motor 14 is still energized through the switch B. Closing of switch C has no effect in this particular program. Closing of switch D, which actually occurred shortly before the completion of the wash cycle, assures that the timer motor continues to operate even though the emptying of the tub causes the water level switch 100 to interrupt the circuit through the switch E. During the pumping period the vitiated water in the tub is removed.

At the end of the pump period, switches G and I are closed to provide a spray rinse, switch G providing for hot water and switch I providing cold water, thereby producing a warm water spray. Since timer switches A and B are still closed, the pump will continue to operate during the spray rinse period in order to remove the spray water as fast as it is admitted to the tub. At the end of the spray rinse, the pumping action continues throughout the pump period and also through the succeeding spin period during which timer switch J is closed to energize the speed change solenoid 13, thereby rotating the basket at relatively high speed to centrifuge the maximum amount of vitiated water.

Thereafter, timer switches G and I are closed to energize the hot and cold water solenoids and admit a mixture of warm water to the tub for a first deep rinse. During this first deep rinse period, the timer switch A is opened, thereby deenergizing the pump solenoid and eliminating the pumping action while the tub is being filled and the clothes agitated for rinsing. Opening of timer switch D at this point shifts control of the timer motor 16 to timer switch E and the water level switch 100, thereby delaying progression of the program until the tub is supplied with the required quantity of water.

At the end of this first deep rinse period, the pump solenoid is again energized by closing of the timer switch A and entry of water to the tub is terminated by opening of timer switches G and I. Timer switch D is closed before the end of the first deep rinse period to insure progression of the program during the pump period, when change in water level would interrupt the timer motor circuit through switch E.

At the end of the pump period, the pumping operation is terminated by opening timer switch A and warm water is again admitted to the tub by closing of timer switches G and I to energize the hot and cold water solenoids. This second deep rinse period is followed by another pumping period during which the water supply solenoids are deenergized by opening of the timer switches G and I and the pump solenoid is energized by closing of the timer switch A. Shortly after commencement of this final pumping period, timer switch C is closed but has no effect on operations of this particular program since selector switch contacts 8—2 are open.

At the end of the period marked "pump," timer switch F is closed, thereby energizing the speed change solenoid 13 and effecting high speed rotation of the basket with consequent centrifuging of vitiated water from the tub. During this "spin" period, the pump continues to operate since both timer switches A and B remain closed. At the end of the "spin" period, all contacts of the timer are opened and the timer will have completed a full revolution and be positioned for start of the next program to be utilized.

Reference to FIG. 7 shows that the selector switch contacts which are closed for program No. 2 are identical to those for program No. 1. Actually, the only difference between programs 1 and 2 is that the timer is manually advanced to omit, entirely, the pre-wash portion of the complete cycle and also to shorten the wash period. Otherwise, the two cycles are identical and, hence, it is believed unnecessary to repeat the description already given in connection with the operation of the various timer switches for this program.

In program No. 3, the only change from programs 1 and 2 is that selector switch contacts 3—6 are closed in addition to the contacts already closed as in programs 1 and 2. It will be noted that closing of selector switch contacts 3—6 places the hot water solenoid 10 and the cold water solenoid 11 in between L1 and contact 3. This change in the selector switch setting results in a warm water wash as distinguished from the hot water wash of programs 1 and 2. Otherwise, the three programs are identical except that, preferably, the warm water wash of program 3 is of shorter duration than that of program 2, which, in turn, is shorter than that of program 1.

Program No. 4 has closed selector switch contacts identical with those of programs 1 and 2 and is provided for use in tinting garments as distinguished from washing them. The tinting program 4 and washing program 1 are identical insofar as circuitry and timer operation are concerned, the only difference being that in wash program No. 1, detergent is added after the prewash period, while in tinting program No. 4, no detergent is used at any time. After the "prewash" period, which is utilized for soaking the clothes to be tinted, the clothes are removed during the first "off" period and the dye admitted to the washer. The dye is mixed with water admitted to the machine during the period marked "special." During the following "off" period, the garments are replaced in the washer for agitation in the diluted dye. Subsequent rinses and centrifuging are effected as in wash program No. 1.

Program No. 5 is provided for use in washing blankets and, for this reason, is somewhat different from the wash programs previously described, as it is desirable to agitate the blankets as little as possible during the wash cycle, since the usual agitation involved in a standard cycle will produce a great deal of felting of the blanket material. Consequently, this No. 5 program eliminates rotation of the tub during the wash period and the three rinses, the blankets merely soaking during those periods. However, the detergent must be thoroughly mixed with the water before the blankets are placed in the tub and the vitiated water must be removed from the blankets at the completion of the program, thus requiring rotation of the basket at the start and end of the program. In order to effect this unusual cycle of operation, the selector switch is moved to a position where its contacts 2—8, 3—6, 3—7 and 4—5 are closed.

The user manually advances the timer mechanism to the "special" period of the program, having first put detergent in the machine, preferably already dissolved in a cup or more of warm water. During this "special" period, timer switches B and C are closed to provide a circuit for the main drive motor from L1 through the motor, selector switch contacts 8—2, timer switch C and timer switch B to L2. Closure of timer switches G and H provides warm water for the tub, and as soon as the water level switch 100 is in "full" position, closing of timer switch E energizes the timer motor, producing advancement of the timer mechanism through the "special" portion of the program.

During this brief "special" period of the program, the water and detergent are agitated and thoroughly mixed by rotation of the basket. At the end of this "special" period, the timer contacts are all opened and the program interrupted for the subsequent "off" period indicated. During this "off" period, the housewife places the blankets to be washed in the washer basket and then manually advances the timer to the beginning of the wash period.

With the selector switch positioned as described, resulting in contacts 8—1 being open and contacts 8—2 being closed, the driver motor 14 is no longer energized by closure of timer switch B during the main wash period of the program, and it will be noted that timer switch C, which when closed in series with switch B energizes the drive motor for this particular program, is not closed during this wash period. Consequently, the basket does not rotate and the blankets merely soak in this portion of this program as distinguished from the usual washing action obtained in the previously described programs where rotation of the basket with consequent agitation of the clothing is effected.

At the end of the main wash period, the pump solenoid is energized by closure of timer switch A and the pump is actually driven during this brief period by closure of timer switches B and C in series. At the end of this first pump period, a mixture of hot and cold water is admitted to the tub as a result of the closure of timer switches G and I in conjunction with the closed switch E and the positioning of the water level switch at "empty." Since the timer switch C is open during this period of the program, the main drive motor will not be energized and the basket will be stationary. However, the timer motor is energized as a result of the closure of timer switch D so that the timer mechanism continues to operate through this "spray rinse" period. This spray rinse is followed by a pumping period wherein the pump solenoid is energized by the closure of switch A and the main motor is energized by the closure of the combination of timer switches B and C. During the latter portion of this pumping action, the basket is rotated at high speed to centrifuge vitiated water from the blankets and this is accomplished by closure of the timer switch J in conjunction with the closing of timer switch E and the positioning of the water level switch at empty.

This first spin period is followed by a first deep rinse which, because the basket does not rotate, might be referred to as a first deep soak. During this period, the tub is filled with a warm water mixture in response to energization of both hot and cold water solenoid by the closing of timer switches G and I. During this period, the basket does not rotate and, as previously mentioned, the clothes merely soak in the stationary basket. At the end of this first deep rinse or soak period, the pump solenoid 12 is again energized by the closure of timer switch A but does not operate because timer switches B and C in series are open, preventing the main motor 14 from driving the pump. At the end of this short period, timer switch A opens, terminating energization of the pump solenoid, then timer contacts B and C in series close, causing the main motor 14 to run for a short period, resulting in a tumbling action for repositioning the blankets for the remainder of the second deep rinse or soak. This second deep rinse or soak is followed by a final pump period which terminates in a spin period, the pump being placed in operation by energization of its solenoid 12 as a result of the closing of timer switch A. The pump is driven by the drive motor 14 which is energized by closing of both timer switches B and C, and during the spin portion of the period, the timer switch F is closed to energize the high speed solenoid and effect centrifuging of the vitiated water from the blankets. At the end of this spin period, all of the timer switches are opened and the timer is positioned for the start of the next program.

Programs 6 and 7 are intended for use with so-called "wash and wear" garments which require treatment at lower temperatures than cottons and linens. These programs are both relatively short, providing for about eight minute washes in warm water followed by cold water rinses. Program 6 provides a final spin period to centrifuge out the vitiated water, but in the No. 7 program the final spin is omitted in order that the apparel may be removed from the washing machine in a wet condition and hung up to drip dry.

In program No. 6, selector switch contacts 1—8, 3—6, 4—5 and 7—9 are closed. The functions of the first three of these pairs of contacts have already been explained in connection with previously described programs. The closing of contacts 7—9 has the effect of providing for a warm water mixture during the main wash period, circuits being established from L1 through the hot water solenoid 10, selector switch contacts 9—7, wire 105, timer switch H, wire 107, timer switch G, wire 104, wire 106, water level switch 100 and timer switch E to L2. A similar circuit is established from L1 through the cold water solenoid 11, selector switch contacts 6—3, wire 103, and timer switch G, where it joins the circuit for solenoid 10, just described. Otherwise, the operations performed in this program are identical with those performed in program 1, first described, with the prewash portion omitted and the main wash period shortened.

Program No. 7 provides for "wash and wear" drip-dry, as previously mentioned, and differs from program 6 only in that the final spin is omitted so that the clothes may be removed wet and hung to drip dry. In this No. 7 program, the omission of the final spin is obtain by leaving selector switch contacts 4—5 open, thereby preventing a final high speed spin when the timer switch F is closed.

Program No. 8 provides a cold water wash followed by cold water rinses and the usual final spin for garments that require no washing treatment with hot or warm water. It will be noted that in this program the selector switch contacts 3—7 and 7—9 are open, which eliminates any possibility of obtaining any hot water for the machine. Except for this change, this program is substantially identical with the wash and wear program 6, the latter providing a warm water mixture for the wash period but cold water for the rinses. In program 8 the warm water wash has been changed to a cold water wash by the switching change just mentioned.

In using the above-described control mechanism, the housewife turns the selector knob 29 to rotate the drum 25 to the desired program, whereupon the line of indicia for the selected program will be positioned adjacent the indicator 40. Rotation of the selector knob 29 will also adjust the selector switch 30 to establish the appropriate circuits for the timer switches, as previously explained.

The housewife now turns the timer knob 24 clockwise to advance the timer mechanism and the indicator 40 until the latter is aligned with the starting point of the line of indicia for the particular program selected. She then closes the line switch in the usual manner, as by pulling the timer knob 24 outwardly, thus initiating the program, which proceeds automatically to its end. Just before completion of the program, the clutch releases the drive between the timer and the indicator, and the latter returns to its extreme left-hand position, ready for the next program.

It will be apparent from the preceding description of the eight programs provided by the specific apparatus herein described, by way of example, that applicants have devised apparatus for selecting any one of a plurality of various programs of actuation of electrical devices and for modifying the circuitry provided by a timer for producing the selected program of operations of such electrical devices and, while the invention has been explained in connection with its application to a clothes washer for home use, it will be apparent that the application of the invention is not limited to the field of laundry equipment but can find application in other fields requiring control apparatus of this type.

While the invention has been shown in but one form, it will be obvious to those skilled in the art that it is not so limited, but is susceptible of various other changes and modifications without departing from the spirit thereof.

What is claimed is:

1. In control apparatus for laundry equipment adapted to apply to fabrics a plurality of selectable programs of treatments, mechanism for controlling initiation and termination of the treatments of said programs, a drum rotatable to a plurality of selectable positions each of which corresponds to a different program of treatments, a line of indicia on the drum for each selectable position of said drum for indicating the order and duration of the treatments for the program corresponding to the drum position selected, said lines of indicia extending parallel to the axis of rotation of said drum, an indicator associated with the line of indicia for the selected drum position, and means operated by said control mechanism for moving said indicator along the last-mentioned line of indicia during the program to indicate at all times the treatment being applied.

2. In control mechanism for apparatus having a plurality of electrical devices which are operated in sequence: a timer for sequentially operating said devices, switch means for modifying the action of said timer to vary the sequence of operation of said devices thereby providing for a plurality of sequences of operations of said devices, a drum rotatable to a plurality of positions each corresponding to a different sequence of operations, indicia carried by said drum for indicating for each drum position the sequence of operations associated therewith, means for rotating said drum to a selected position and simultaneously adjusting said switch means for modifying the action of said timer to effect the sequence of operations corresponding to the selected drum position, and indicating means operated by said timer and cooperating with the indicia for the selected drum position for indicating progression of the selected sequence of operations of the devices.

3. In control mechanism for apparatus having a plurality of electrical devices which are operated in sequence: a timer for sequentially energizing said devices, switch means for modifying the action of said timer to vary the sequence of operation of said devices, thereby providing a plurality of sequences of operation of said devices, a multi-surfaced drum rotatable to a plurality of selected positions corresponding to different selected sequences of operation of said devices and in which positions it presents different surfaces, each of said surfaces bearing a line of indicia representative of the sequence of operations corresponding to the selected drum position in which each such surface is presented, and manually operable means for rotating said drum to a selected position and simultaneously adjusting said switch means for modifying the action of said timer to effect the selected sequence of operation of the devices.

4. In control mechanism for apparatus having a plurality of electrical translating devices which are operated in sequence: a timer for sequentially operating said translating devices, switch means for modifying the action of said timer to vary the sequence of operation of said translating devices, thereby providing for a plurality of sequences of operations of said translating devices, a drum rotatable to a plurality of positions each corresponding to a different sequence of operations, lines of indicia on said drum extending parallel to the axis of rotation thereof for indicating for each drum position the sequence of operations associated therewith, means for rotating said drum to a selected position and simultaneously adjusting said switch means for modifying the action of said timer to effect the sequence of operations corresponding to the selected drum position, and indicating means operated by said timer for straight line travel parallel to the axis of rotation of the drum and cooperating with the indicia for the drum position selected for indicating progression of the selected sequence of operations of the translating devices.

5. In control mechanism for apparatus having a plurality of electrical translating devices which are operated in sequence: a timer for sequentially operating said translating devices, switch means for modifying the action of said timer by eliminating the operation of one or more of said translating devices to vary the sequence of operation of said plurality of translating devices, thereby providing for a plurality of sequences of operations of said translating devices, a drum rotatable to a plurality of positions each corresponding to a different sequence of operations, indicia carried by said drum for indicating for each drum position the sequence of operations associated therewith, means for rotating said drum to a selected position and simultaneously adjusting said switch means for modifying the action of said timer to effect the sequence of operations corresponding to the selected drum position, and indicating means operated by said timer and cooperating with the indicia for the drum position selected for indicating progression of the selected sequence of operations of the translating devices.

6. In control mechanism for apparatus having a plurality of electrical devices which are operated in sequence: electrical circuits for said devices, a plurality of switches for said circuits, a timer for sequentially actuating said switches, selector switch structure including a plurality of additional switches in said circuits, adjustment of said selector switch to different positions opening or closing various switches of said additional switches thereby varying the circuits controlled by said timer and providing a plurality of sequences of operations of said devices, a drum rotatable to a plurality of positions each corresponding to a different sequence of operations of said devices, indicia carried by said drum for indicating for each drum position the sequence of operations associated therewith, means for rotating said drum to a selected position and concurrently adjusting said selector switch structure for varying the circuits controlled by said timer to effect the sequence of operations corresponding to the selected drum position, and indicating means operated by said timer and cooperating with the indicia for the selected drum position for indicating progression of the selected sequence of operation of the devices.

7. In a program control for a laundry machine having a plurality of electric devices, the combination of a plurality of switches connected to the devices, a rotary cam structure for actuating the switches in a predetermined sequence, timing means driving the cam structure, switching means connected to at least a portion of the electrical devices and said switches and movable to selective stations for controlling the sequence of operation of said devices to provide different laundering programs, a member movable with the switching means and carrying respective lines of indicia corresponding to the various programs, a pointer movable with the cam structure and disposed adjacent the line of indicia corresponding to the selected program, said lines of indicia being rectilinear and each terminating opposite said pointer when the latter assumes its position at the conclusion of a sequence of operation of said switches, at least a portion of said lines of indicia being of different lengths to provide for laundering programs of different durations, means for converting rotary motion of said cam structure to rectilinear movement of the pointer and means rendered effective at the end of a sequence of operation of the switches for returning said pointer to its starting position independently of the cam structure.

8. In a controller for sequentially operating a plurality of electrical devices, the combination of a plurality of switches connected to the respective devices, a rotary cam structure for actuating the switches, timing means for rotating the cam structure, indicia arranged rectilinearly for indicating the position of the cam structure and the function being effected by the controller, a pointer arranged adjacent the indicia and movable rectilinearly therealong, a belt fixed to the pointer for movement thereof, a reel driving the belt, means biasing said belt and pointer toward the starting end of the indicia, clutching means interposed between the cam structure and said reel for driving the reel during rotation of the cam structure, and means associated with the clutching means for disengaging the cam structure and reel at the conclusion of a cycle of operation, the construction and arrangement being such that the pointer is returned by the biasing means to the starting end of the indicia for a subsequent operation of the controller.

9. In control apparatus for laundry equipment adapted to apply to fabrics a plurality of selectable programs of treatments, timer mechanism for controlling initiation, duration and termination of each treatment of said programs of treatments, switch means for selectively modifying the controlling action of said timer mechanism, a member movable to a plurality of selectable positions each of which corresponds to a different program of treatments, indicia carried by said movable member for indicating the program corresponding to the member position selected, and manually operable means for moving said movable member to the position corresponding to a selected program and for simultaneously adjusting said switch means to modify the controlling action of said timer mechanism to effect the order and duration of the treatments constituting the selected program.

References Cited in the file of this patent

UNITED STATES PATENTS

| | | |
|---|---|---|
| 2,391,718 | Lindemann | Dec. 25, 1945 |
| 2,502,823 | Clark | Apr. 4, 1950 |
| 2,767,332 | Willard | Oct. 16, 1956 |
| 2,798,302 | Reiter | July 9, 1957 |
| 2,863,237 | Mathews | Dec. 9, 1958 |